F. C. GEILER

Nov. 8, 1932. TRAY FOR REFRIGERATING UNITS Re. 18,650

2 Sheets-Sheet 1

Original Filed May 26, 1926

Inventor

Frederick C. Geiler,

By Toulmin & Toulmin,

Attorneys

F. C. GEILER

Nov. 8, 1932. TRAY FOR REFRIGERATING UNITS Re. 18,650

Filed May 26, 1926 2 Sheets-Sheet 2

Inventor

Frederick C. Geiler,

By Toulmin & Toulmin,

Attorneys

Reissued Nov. 8, 1932

Re. 18,650

UNITED STATES PATENT OFFICE

FREDERICK C. GEILER, OF DAYTON, OHIO, ASSIGNOR, BY MESNE ASSIGNMENTS, TO FRIGIDAIRE CORPORATION, A CORPORATION OF DELAWARE

TRAY FOR REFRIGERATING UNITS

Original No. 1,780,422, dated November 4, 1930, Serial No. 111,874, filed May 26, 1926. Application for reissue filed July 29, 1932. Serial No. 626,164.

This invention relates to trays for refrigerating units.

Refrigerating units are provided with a freezing chamber or compartment adapted to receive trays.

The object of the present invention is to provide such a tray with removable members whereby water, sherbet or orangeade, lemonade or the like may be frozen in the form of shells, the cavity of which may be utilized to contain fruit, ice cream, custard, etc., according to whatever combination may be desirable to provide a palatable as well as an attractive article of food.

It is a further object of the invention to provide a tray which may be utilized for freezing blocks of ice of different sizes.

Another object of the invention is to provide a container for freezing a number of blocks of ice of a size suitable for table use, arranged in such a manner that a small number of the blocks in the container may easily be removed without disturbing the remainder of the blocks in the container.

Figure 1:
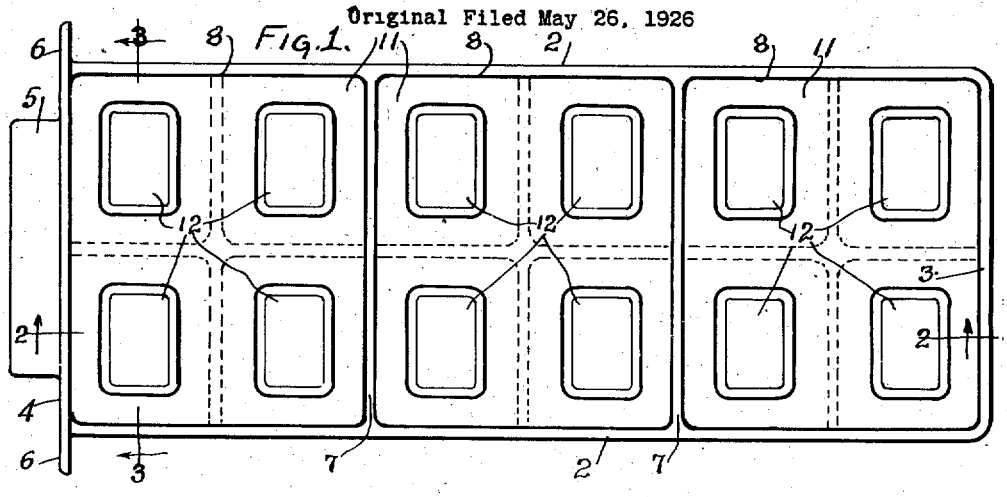
Fig. 1 is a plan view of my improved tray.

In the drawings the tray proper is made of metal and is in the form of a drawer having a bottom 1, side walls 2, rear end wall 3 and front wall 4 provided with a handle 5 to facilitate the removal of the drawer from the cooling unit. The front wall is also provided with flanges 6 to close the space between the freezing chamber and the trays. Partitions 7 divide the drawer into a plurality of compartments 8.

Figure 2:
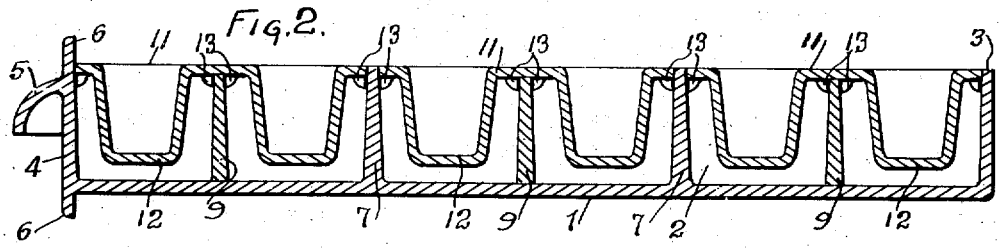
Fig. 2 is a vertical section on the line 2—2 of Fig. 1 and looking in the direction of the arrows.
Figure 4:
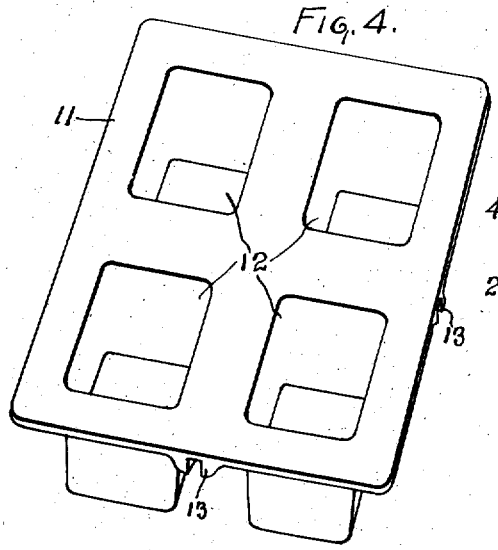
Fig. 4 is a perspective of one of the removable sections of my tray.
Figure 3:
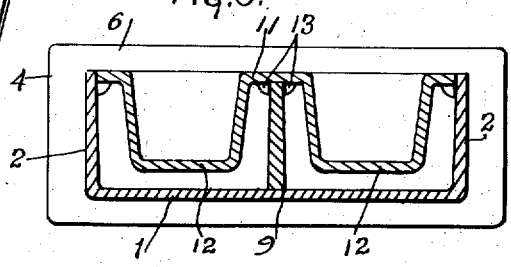
Fig. 3 is a section taken on the line 3—3 of Fig. 1 and looking in the direction of the arrows.

It is contemplated that the tray may be cast, in which case the partition 7, as shown in Fig. 2, is integral with the sides and bottom of the tray. This forms a permanent intimate thermal contact between the tray and the partitions. However the invention is not limited to forming the tray and partition by casting, any suitable method and any suitable manner of joining the partitions to the tray being within the spirit of the invention.

Figure 5:
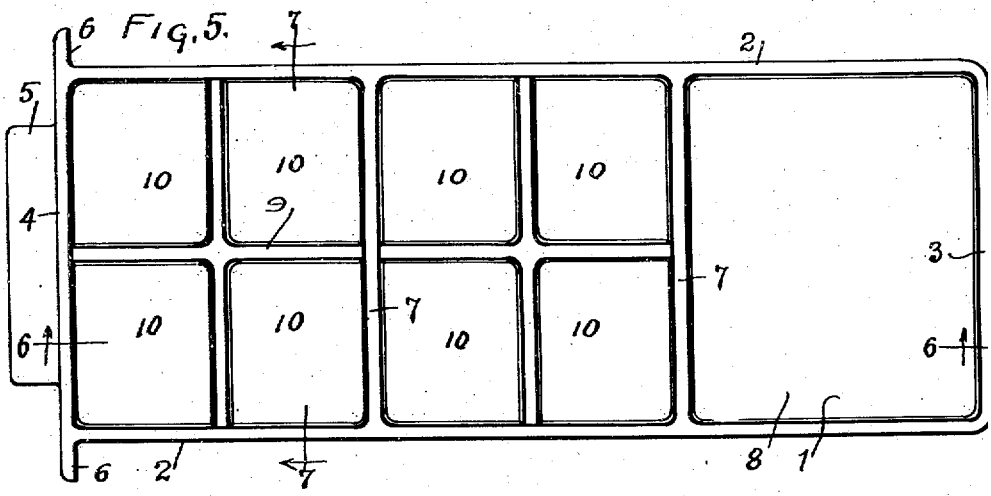
Fig. 5 is a plan view of the drawer section of my tray showing removable partitions in two of the compartments.
Figure 6:
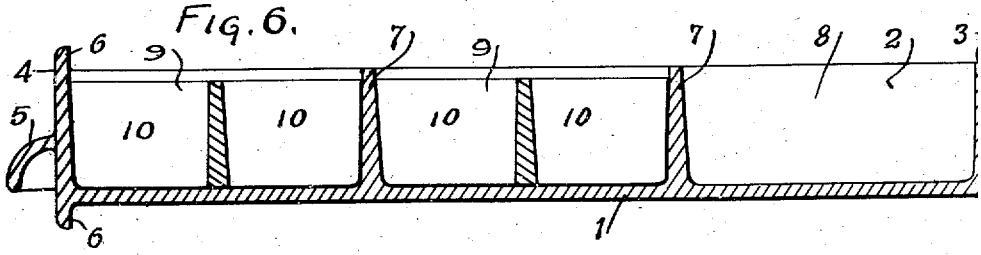
Fig. 6 is a section taken on the line 6—6 of Fig. 5 and looking in the direction of the arrows.
Figure 8:
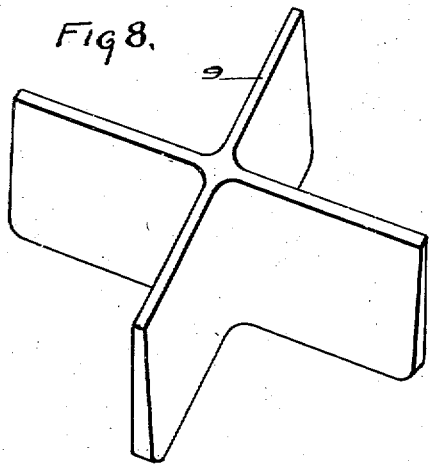
Fig. 8 is a perspective view of one of the removable partitions.
Figure 7:
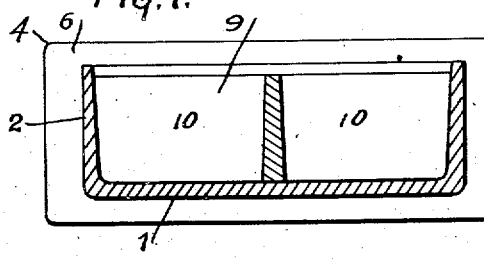
Fig. 7 is a section taken on the line 7—7 of Fig. 5 and looking in the direction of the arrows.

In Fig. 8 is shown one of the removable supplemental partitions 9 adapted to be positioned in one of the compartments 8 of the tray proper and subdivide such compartment into a plurality of smaller compartments 10 as shown in Figs. 5 and 6. In these compartments smaller blocks of ice may be frozen.

In order to freeze the liquid placed in the compartments 8 into a plurality of blocks with cavities in the upper surface to receive a suitable article of food the partitions 9 are first positioned in the several compartments and supported by these partitions are removable sections each having a top plate 11 and a plurality of cups 12, the outer surfaces of the latter forming the cavities in the blocks frozen in the compartments 10, the inside of the cups serving as an easy means of inserting and removing said removable sections. These removable sections must be of sufficient weight to rest on the partitions and are preferably made of cast metal, the under surface of the plate 11 being provided with lugs 13 to position it in removable interlocking engagement on the partitions 7 and 9.

Thus it will be seen that I have provided a tray with removable sections which may be utilized to freeze any desired liquid into blocks with a cavity in the upper surface adapted to receive fruit or any desired article of food, thereby producing palatable as well as attractive food. It will also be understood that the tray may be utilized to freeze different size blocks of ice for other purposes, as desired.

For example by removing the cup sections 11 and the grids 9, relatively large blocks of ice may be frozen or the compartments 8 may be used to congeal various sorts of frozen desserts. To this end the compartments 8 are made of a convenient size and shape for freezing or congealing desserts in individual portions.

Likewise by removing the cup sections 11 and using the grids 9, the tray will freeze cubes of ice of a suitable size for table use. These cubes may be removed from the tray by inverting the tray and pouring warm water over the bottom in the customary manner. The partitions 7 facilitate the removal of a portion of the blocks without disturbing the remainder of the blocks in the tray, since they are in intimate contact with the bottom and walls of the tray and thus form heat conducting fins between groups of blocks. Thus by inverting the tray and running relatively warm water over one end only the group of blocks contained within the compartment at that end will be readily dislodged, due to the heat conducted through one of the partitions 7, while the remaining blocks need not be disturbed.

It will be understood that I desire to comprehend within my invention such modifications as may be necessary to adapt it to varying conditions and uses.

Having thus fully described my invention, what I claim as new and desire to secure by Letters Patent, is:—

1. An ice-making receptacle for domestic mechanical refrigerators comprising in combination, a thermally conducting container for liquid to be frozen, removable means for subdividing the container into a plurality of cells each adapted to freeze a block of ice suitable for table use, means for facilitating the removable of a number of said blocks without disturbing the remainder of said blocks, said last mentioned means comprising a thermally conducting fin dividing the blocks into groups, said fin being permanently secured to the container in intimate thermal contact with the walls of the container.

2. An ice-making receptacle for domestic mechanical refrigerators comprising in combination, a flat bottomed container for liquid to be frozen adapted to be placed in intimate contact with a cooling element, partition means dividing the container into a plurality of compartments, said partition means being removable from said container, and means projecting into the individual compartments for holding liquid therein in flat bottomed cup-shaped masses during freezing.

3. An ice-making receptacle for domestic mechanical refrigerators comprising in combination, a flat bottomed container for liquid to be frozen adapted to be placed in intimate contact with a cooling element, partition means dividing the container into a plurality of compartments, said partition means being removable from said container, means associated with the top of the container including a plurality of cups projecting downwardly into the individual compartments for holding liquid therein in flat bottomed cup-shaped masses during freezing.

4. An ice-making receptacle for domestic mechanical refrigerators comprising in combination, a flat bottomed container for liquid to be frozen, adapted to be placed in intimate contact with a cooling element, partition means dividing the container into a plurality of compartments and removable means supported on the partition means and including a plurality of cups projecting into the individual compartments for holding liquid therein in flat bottomed cup-shaped masses during freezing.

5. An ice-making receptacle for domestic mechanical refrigerators comprising in combination, a flat bottomed container for liquid to be frozen adapted to be placed in intimate contact with a cooling element, partition means dividing the container into a plurality of compartments, said partition means being removable from said container, a cover for the container, and a plurality of cups on said cover, the cups being spaced to project into the individual compartments to hold liquid therein in flat bottomed cup-shaped masses during freezing.

6. In combination, a thermally conducting tray adapted to be placed in intimate thermal contact with a cooling unit of a refrigerating system and adapted to contain a substance to be congealed or frozen, a unitary grid including fixed intersecting walls of thermally conducting material for dividing the interior of said tray into a plurality of compartments, said grid being removable from said tray, and thermally conducting means in detachable interlocking engagement with said grid and extending into said compartments.

7. In combination, a tray adapted to be placed in thermal contact with a cooling element of a mechanical refrigerating system and forming a compartment adapted to contain a substance to be congealed or frozen, a grid including intersecting walls for dividing the interior of said compartment into a plurality of molds, said grid being removable from said compartment, a cover for said plurality of molds, and means extending into said molds from said cover for modifying the interior design of said plurality of molds.

8. In combination, a tray member adapted to be placed in thermal contact with a cooling unit of a refrigerating system and adapted to contain a substance to be congealed or frozen, a grid member including intersecting walls of thermal conducting material for dividing the interior of the tray member into a plurality of compartments, said grid member being removable from said tray member, and thermal conducting means in detachable interlocking engagement with one of said members and extending into said compartments for altering the configuration of the interior of the compartments.

9. In combination, a tray adapted to be placed in thermal contact with a cooling unit of a refrigerating system and adapted to contain a substance to be congealed or frozen, a grid including intersecting walls of thermal conducting material for dividing the interior of the tray into a plurality of compartments, said grid being removable from said tray, and thermal conducting means in detachable interlocking engagement with said grid and extending into said compartments for altering the configuration of the interior of the compartments.

10. In combination, a tray member adapted to be placed in thermal contact with a cooling unit of a refrigerating system and adapted to contain a substance to be congealed or frozen, a unitary grid member including fixed intersecting walls for dividing the interior of the tray into a plurality of compartments, said grid member being removable from said tray member, and means in detachable interlocking engagement with one of said members and extending into said compartments for altering the configuration of the interior of the compartments.

11. In combination, a tray adapted to be placed in thermal contact with a cooling unit of a refrigerating system and adapted to contain a substance to be congealed or frozen, a unitary grid including fixed intersecting walls for dividing the interior of the tray into a plurality of compartments, said grid being removable from said tray, and means in detachable interlocking engagement with said grid and extending into said compartments for altering the configuration of the interior of the compartments.

12. In combination, a tray member adapted to be placed in thermal contact with a cooling unit of a refrigerating system and adapted to contain a substance to be congealed or frozen, means formed integral with said tray member for dividing the interior thereof into a plurality of open-top chambers, a grid member including intersecting walls for dividing the interior of one of said chambers into a plurality of compartments, said grid member being removable from said tray member, and means in detachable interlocking engagement with one of said members and extending into said compartments for altering the configuration of the interior of the compartments.

13. In combination, a tray adapted to be placed in thermal contact with a cooling unit of a refrigerating system and adapted to contain a substance to be congealed or frozen, means formed integral with said tray for dividing the interior thereof into a plurality of open-top chambers, a grid including intersecting walls for dividing the interior of one of said chambers into a plurality of compartments, said grid being removable from said tray, and means in detachable interlocking engagement with said grid and extending into said compartments for altering the configuration of the interior of the compartments.

14. In combination, a tray adapted to be placed in thermal contact with a cooling element of a mechanical refrigerating system, means formed integral with said tray and dividing the interior thereof into a plurality of compartments adapted to contain a substance to be congealed or frozen, a grid including intersecting walls in each of said compartments for dividing the compartments into a plurality of molds, each of said grids being removable from said compartments, a cover for each of said compartments and the plurality of molds formed therein, and means extending from said covers into said molds for modifying the interior design of said plurality of molds.

In testimony whereof I hereto affix my signature.

FREDERICK C. GEILER.